(12) United States Patent
Cesur et al.

(10) Patent No.: US 7,841,258 B2
(45) Date of Patent: Nov. 30, 2010

(54) BICYCLE SHIFT CONTROLLER

(75) Inventors: Cengiz Cesur, Munster (DE); Atsushi Komatsu, Sakai (JP)

(73) Assignee: Shimano Inc., Osaka (JP)

( * ) Notice: Subject to any disclaimer, the term of this patent is extended or adjusted under 35 U.S.C. 154(b) by 303 days.

(21) Appl. No.: 11/546,948

(22) Filed: Oct. 13, 2006

(65) Prior Publication Data

US 2007/0137385 A1 Jun. 21, 2007

(30) Foreign Application Priority Data

Dec. 1, 2005 (DE) .................... 20 2005 018 878 U
May 29, 2006 (DE) .................... 20 2006 008 605 U

(51) Int. Cl.
*F16C 1/12* (2006.01)

(52) U.S. Cl. .................... 74/501.6; 74/489; 74/473.14; 74/551.8

(58) Field of Classification Search ................ 74/501.6, 74/502.2, 488, 489, 473.14, 551.8
See application file for complete search history.

(56) References Cited

U.S. PATENT DOCUMENTS

| 5,012,692 | A | * | 5/1991 | Nagano | .................... 74/473.14 |
| 5,191,807 | A | * | 3/1993 | Hsu | .......................... 74/501.6 |
| 5,203,213 | A | * | 4/1993 | Nagano | .................... 74/473.14 |
| 6,450,060 | B1 | * | 9/2002 | Shahana | .................... 74/502.2 |
| 6,581,568 | B2 | * | 6/2003 | Kramer | ....................... 123/398 |
| 6,820,710 | B2 | * | 11/2004 | Fechner | ....................... 180/170 |
| 2004/0040402 | A1 | * | 3/2004 | Tsumiyama et al. | ........ 74/501.6 |

* cited by examiner

*Primary Examiner*—Richard W Ridley
*Assistant Examiner*—Alan B Waits
(74) *Attorney, Agent, or Firm*—Global IP Counselors, LLP

(57) ABSTRACT

A bicycle shift controller is provided with two independently operable levers that are operatively coupled to a cable take up member disposed in a base member configured to be mounted to a handlebar. The cable take up member rotates about a rotational axis for winding and releasing a control cable in response to pivotal movement of the levers. A first one of the levers has a first operating portion with a first operating surface and a second operating portion with a second operating surface. The second operating surface is angularly offset from the first operating surface about a first lever pivot axis of the first lever. The first and second levers pivot from a rest position to a shift position for rotating the cable take up member in opposite directions.

13 Claims, 4 Drawing Sheets

BICYCLE SHIFT CONTROLLER

CROSS-REFERENCE TO RELATED APPLICATIONS

This application claims priority under 35 U.S.C. §119 to German Utility Model Patent Application No. 20 2005 018 878. The entire disclosure of German Utility Model Patent Application No. 20 2005 018 878 is hereby incorporated herein by reference.

BACKGROUND OF THE INVENTION

1. Field of the Invention

This invention generally relates to a bicycle shift controller. More specifically, the present invention relates to a bicycle shift controller two independently operable levers.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle shift controller.

With respect to the actual shifting operation, bicycle shift controllers can be divided into at least two groups. A first kind of bicycle shift controller has a lever rotatably coupled to the base member for rotating the cable take up member into a plurality of positions, whereby each position represents a respective gear. Thus for a shift controller that is to shift the bicycle's gear transmission between a plurality of different gears, the cable take up member has a first position for the first gear, a second position for a second gear and a "n"th position for a "n"th gear. The lever also has a first position for the first gear, a second position for the second gear and a "n"th position for the "n"th gear. Shifting between the respective gears thus occurs by shifting the lever from one position to another position, whereby the lever remains in that other position once shifting has been completed. This kind of bicycle shift controller is disclosed in U.S. Pat. No. 5,186,071 (Assigned to Maeda Industries, Ltd.).

Another type of bicycle shift controller is the type of controller applicable to the invention described below. Here, one lever is used for rotating the cable take up member in a cable-release direction, whereby another lever is used for rotating the cable take up member in a cable-winding direction. At least one of the levers is designed in such a manner that it has a rest position and a shift position, whereby the lever preferably returns automatically to the rest position once the shifting has been completed. This second type of bicycle shift controller with the lever automatically returning to the rest position provides the advantage that the lever will always rest in the rest position and thus always be in the same relative position to the handlebar before the shifting action takes place. This allows the user to get used to a relative position of the lever with respect to the handlebar. If the user wants to initiate the shifting process, he will always find the lever in the same position, which is considered as more comfortable.

Using one lever for rotating the cable take up member in a cable-release direction and another lever for rotating the cable take up member in a cable-winding direction further has the advantage that the user can get used to using the one lever to increase the gearing and use the other to decrease the gearing. This also makes use of this type of bicycle shift controller more comfortable.

A bicycle shift controller is disclosed in U.S. Pat. No. 5,601,001. This patent realizes the advantages of having a lever with a rest position and a shift position, but does not realize the advantages of assigning the cable-release direction to one lever while assigning the cable-winding direction to another lever. Here, a base member mountable to a handlebar via a lever bracket that also pivotally supports a brake lever is provided. A cable take up member is rotatably coupled to the base member for pulling and releasing a control cable. A single lever is rotatably coupled to the base member about a rotational axis for rotating the cable take up member, the lever having a rest position and a first shift position ("up"-position) and a second shift position ("down"-position). The single lever is designed with the shape of the letter Y, whereby the base portion of the lever is rotatably coupled to the base member for rotating the cable take up member and whereby the first arm points forward with respect to the bicycle traveling direction when the bicycle shift controller is attached to the handlebar for normal usage and whereby the second arm points backwards. The forward pointing first arm of the Y-shaped lever has an operating surface designed on the forward facing part of said forward pointing arm. The second, backward pointing arm also has an operating surface, this operating surface, however, being designed on the backward facing side of this second, backward facing arm of the lever. The forward facing operating surface is situated and provided for allowing the user to comfortably pull the single lever backwards in what is called "down" direction for shifting the gearing of the bicycle transmission downward. The second, backward facing operating surface is designed and provided for allowing the user to comfortably push the lever in the forward direction (called "up" direction). Though allowing for comfortable and easy-to-learn shifting, because for each of the respective shifting actions (upward-shifting, downward-shifting) the user can refer to the same sequence of movements, use of the bicycle shift controller is limited to this type of movements.

In view of the above, it will be apparent to those skilled in the art from this disclosure that there exists a need for an improved bicycle shift controller. This invention addresses this need in the art as well as other needs, which will become apparent to those skilled in the art from this disclosure.

SUMMARY OF THE INVENTION

One object of the present invention is to provide a bicycle shift controller having a pair of independently operable lever that has improved functionality for shifting by providing the user with different options in operating one of the levers.

In accordance with one aspect of the present invention, a bicycle shift controller is provided that basically comprises a base member, a cable take up member, a first lever and a second lever. The base member is configured to be mounted to a handlebar. The cable take up member is rotatably coupled to the base member to rotate about a rotational axis for winding and releasing a control cable. The first lever includes a first operating portion with a first operating surface and a second operating portion with a second operating surface. The second operating surface is angularly offset from the first operating surface about a first lever pivot axis of the first lever. The first lever is pivotally coupled to the base member to pivot about the first lever pivot axis from a rest position to a shift position by exerting pressure on one of the first and second operating surfaces for rotating the cable take up member in a first direction. The second lever is pivotally coupled to the base member for rotating the cable take up member in a second direction opposite to the first direction. The second lever is independently movable relative to the first lever.

The invention is based on the general idea of providing the user with a further operating surface for the shifting action of the first lever from its rest position to its shift position. Thereby, the invention increases the functionality of a bicycle shift controller, because now the user can choose his preferred way of operating the first lever. Preference could be made by the user, because he simply finds one way of operating the first lever more comfortable than the other way of operating it. Preference could also be made on the basis of a current position of the hand on the handlebar. The user can, for example, choose to use the one shifting action, if he happens to hold his hand in a certain position on the handlebar, while he may choose to shift the lever with a second movement, when he is holding the hand in a different position on the handlebar.

Levers of bicycle shift controllers are generally designed to be used intuitively. Thus, the levers have portions that are clearly designed as intermediate portions, for example with slim cross-sections or orientated in such a manner that they are slimmer in their vertical extension than they are in their horizontal extension when attached to a handlebar for normal usage. Contrary to these intermediate portions, levers of bicycle shift controllers have operating surfaces. These differ from the intermediate portions in that the operating surfaces have a shape that intuitively makes it clear to the user that the lever is to be operated by contacting these surfaces. One possible indication of an operating surface is an especially smooth surface. Furthermore, operating surfaces can be orientated in a plane that lies in an angle to the plane of rotation of the lever. Preferably it lies in a plane that is orientated essentially perpendicular to the plane of rotation of the lever. The operating surface also can have a certain size of area in the plane angled to the plane of rotation. In a preferred embodiment, an operating surface is understood to have an area of 100 mm$^2$, more preferably of more than 300 mm$^2$. An operating surface is preferably understood to be characterized by at least one of the above mentioned characteristics, most preferably, however, by any combination of the above mentioned characteristics and most preferred by all above mentioned characteristics (as far as compatible).

According to the invention, the second operating surface is angularly offset from the first operating surface about the rotational axis. The angular offset is especially understood for the centre of area of the second operating surface to be angularly offset from the centre of area of the first operating surface in polar coordinates based on the rotational axis. In embodiments where the second operating surface borders the first operating surface, the term "angular offset" is also to stand for the second operating surface to be orientated in an angle to the first operating surface.

In an especially preferred embodiment, the bicycle shift controller according to the invention allows the user to shift the first lever either by pushing the first operating surface of the first lever with his thumb from the rest position to the shift position or by exerting pressure on the second operating surface with the back of one of the remaining four fingers, especially with the back of the index finger (herein below, reference will be made to the index finger without limiting the scope of protection to an action of this finger; where the term "index finger" is used below, it stands for any of the remaining four fingers of a hand but the thumb).

In a preferred embodiment, the first lever is a cable release lever for rotating the cable take up member in a cable-release direction and the second lever is a pull lever for rotating the cable take up member in a cable-winding direction. Especially if the second operating surface of the first lever is such arranged as to allow the user to perform the shifting action by means of exerting pressure on the second operating surface with the back of the index finger, it is preferable to have the first lever perform the releasing action, as this can be performed with applying less force on the operating surface and less stroke of the first lever. However, the invention is not limited to assigning the release-action to the first lever. On the contrary, the first lever can be the pull lever for rotating the cable take up member in a cable-winding direction, while the second lever can be the cable release lever for rotating the cable take up member in a cable-release direction. Furthermore, the invention is not limited to the shifting direction of the first lever from the rest position to the shift position to be directed in the so called "forward" direction (which is a reference to the direction in relation to the bicycle traveling direction when the bicycle shift controller is attached to the handlebar for normal usage). On the contrary, the shifting action of the first lever could be in a "backward" direction. In this case, the first operating surface could be facing forward and the pressure could be exerted by contacting that first operating surface and pulling back the lever, while, for example, the second operating surface could be arranged in such a way as to be contacted by the back of the thumb and being moved backwards by exerting pressure on that second operating surface.

Likewise, the invention is not limited to a specific operating direction or operating mechanism of the second lever. The shifting-operation of the second lever can be in the same direction as the one of the first lever or can be opposite to the shifting direction of the first lever.

In a preferred embodiment, the second operating surface is extending from the first operation surface. It is advantageous, if the second operating surface borders the first operating surface, because the user will then realize intuitively that the second operating surface can also be used for performing the shifting action that is performed when exerting pressure on the first operating surface.

In a preferred embodiment, both the first operating surface and the second operating surface face backward and/or downward when the bicycle shift controller is attached to the handlebar for normal usage. It has become apparent that the shifting of a lever can more easily be performed, if the lever is pushed forward with respect to the bike traveling direction. Thus the first operating surface and the second operating surface can be arranged to face backward and/or downward to indicate to the user that the (forward) shifting action is performed by applying pressure on the backward and/or downward facing surfaces, which then leads to a forward movement of the lever. Normal usage is to be understood as the position that the bicycle shift controller is normally connected in to the handlebar, for example, as instructed by the instruction manual, or it is also to be understood as the position where the rider can operate it quite naturally or without much stress/difficulty. For some bicycle shift controllers, normal usage is understood for the levers to be arranged essentially below the horizontal plane of the centre axis of the handlebar.

In a further improved embodiment, the second operating surface is located in a forward position with respect to the first operating surface when the bicycle shift controller is attached to the handlebar for normal usage. This embodiment especially allows the second operating surface to be arranged in such a manner that shifting of the first lever can be achieved by means of exerting pressure on the second operating surface with the back of the index finger.

One advantage derived from the increased functionality of the bicycle shift controller provided by the invention is the possibility to guide the user intuitively to performing a new way of operating levers. While the prior art shows levers that are either pushed forward with the thumb or pulled backward with the index finger, the especially preferred way of putting the invention into practice is to arrange the second operating surface in a manner for allowing shifting by the back of the index finger. Shifting by the back of the index finger is understood to mean any shifting action whereby at least a part of the back of the index finger contacts an operating surface and whereby pressure is exerted on that operating surface by a force that is applied via this part of the index finger. Some possible ways of affecting this shift are as follows:

The second operating surface can be such arranged that it is contacted by the back of the finger as a finger previously held curled around the handlebar is partially uncurled. The second operating surface can also be such arranged that it is contact by the back of at least a part of the finger as the (possibly extended) finger is rotated about its knuckle with the centre portion of the hand. This rotation can, for example, take place from a starting point, whereby the joint closest to the knuckle is held in contact with the handlebar or whereby, for example, the finger has already been lifted away from the handlebar and is moved further away from the handlebar during the shifting action.

In a preferred embodiment, the first operating surface is arranged in an area where it is pushed by the user with his thumb while the second operating surface is arranged in an area where it is pushed with the back of the index finger of the user.

In a further preferred embodiment, the second operating surface is located in a forward position with respect to a central handlebar axis when the bicycle shift controller is attached to the handlebar for normal usage. When gripping a handlebar, the user generally will grip the handlebar in such a manner that the thumb is facing backwards while the remaining fingers are facing forward. In order to intuitively lead to a shifting action by the back of the index finger, which for example can be achieved by extending the index finger and rotating it forward around its knuckle with the central portion of the hand, it is advantageous to have the second operating surface located in a forward position with respect to that central handlebar axis.

In a preferred embodiment, the shift position is located in a forward position with respect to the rest position when the bicycle shift controller is attached to the handlebar for normal usage. It has been realized that the preferred way of shifting is to move the lever forward.

In a further preferred embodiment, the first lever has a third operating portion having a third operating surface, the second operating surface is located in a forward position with respect to the first operating surface, the third operating surface is located in a forward position with respect to the second operating surface when the bicycle shift controller is attached to the handlebar for a normal usage.

The third operating surface can for example be provided in embodiments, where the first lever can rotate the cable take up member in the first direction by being shifted either in one direction or another direction. The connection of the first lever to the cable take up member can be designed in such a way that regardless of the first lever being shifted forward from its rest position or being shifted backward from its rest position, it still rotates the cable take up member in that one, first direction. With such an embodiment, for example, the third operating surface can be arranged to be contacted for pulling back the first lever.

In a preferred embodiment, the first operating portion and the second operating portion are integrally formed. Levers of the type used with bicycle shift controllers often are produced by injection molding. Designing the first operation portion and the second operating portion as integral parts allows for easy manufacturing of the first lever. Alternatively, the second operating portion can be designed as an extension member attached to the first operating portion. This design especially allows existing bicycle shift controllers to be a retro-fitted with a second operating portion that allows to make use of the current invention.

In an especially preferred embodiment, the respective gear change is affected by a first lever and a second lever, the first lever being in front of the second lever with respect to the traveling direction that is behind the first lever with respect to the pushing direction of a thumb pushing the second lever forward in the traveling direction. Movement of the first lever can for example affect a gear change to become a higher gear ratio and movement of the second lever can for example affect a gear change to become a lower gear ratio. The two levers can be operated by applying pressure with the thumb. However, because of the first lever being arranged in front of (with respect to the pushing direction of the thumb) the second lever, operating the first lever with the thumb can in some arrangements be difficult. In providing the extension member that can be connected to the first lever, the gear shift can be accelerated. Because of the extension member, the shifting action can be affected with slight pressure by the back of the index finger.

In a preferred embodiment, the second operating surface has a concave shape. It has been realized that concave shapes are comfortably for the user. Especially if according to a preferred embodiment of the invention, the second operating surface is to be contacted with the back of the index finger, the use of a concave shaped second operating surface increases the comfort of using the bicycle shift controller according to the invention. Alternatively, soft material such as rubber sheet may be attached on the second operating surface for comfortable shifting operation with the back of the index finger.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
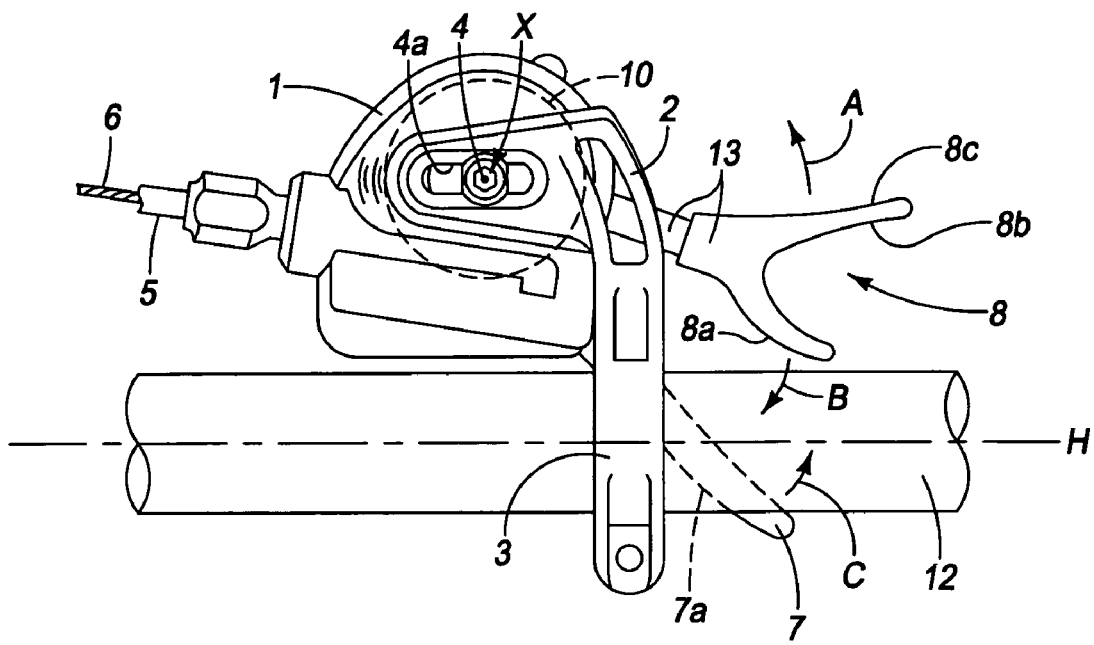
FIG. 1 is a simplified top plan view of a bicycle shift controller according to a first embodiment of the present invention, with the shift controller being attached to a handlebar for normal usage.

Referring initially to FIG. 1, a bicycle shift controller is illustrated in accordance with a first embodiment of the present invention. The bicycle shift controller shown in FIG. 1 includes a housing 1, a bracket 2 with a clamping portion 3. The housing 1, the bracket 2 with its clamping portion 3 form a base member with the clamping portion 3 defining a central handlebar axis H that is mountable to a handlebar 12. The housing 1 is connected to a bracket 2 by a fixing bolt 4. The housing 1 is connected to the handlebar 12 via the bracket 2 and its clamping portion 3. The fixing bolt 4 is arranged in an elongated hole 4a of the bracket 2 allows for a releasable connection between the housing 1 and the bracket 2. This releasable connection allows the relative position between the housing 1 and the bracket 2 to be adjusted. However, by screwing the fixing bolt 4 tight, a fixed relation between the housing 1 and the bracket 2 can be attained.

In this embodiment, the base member has a control cable 6 that is operatively coupled to both a cable winding lever 7 and a cable release lever 8. In particular, the cable winding lever 7 and the cable release lever 8 are operatively coupled to a cable take up member 10 that is rotatably mounted within the housing 1 of the base member about a rotational axis X. The cable winding lever 7 and the cable release lever 8 are also pivotally mounted about the rotational axis X of the cable take up member 10. In other words, the cable winding lever 7 and the cable release lever 8 have pivot axes that are coincident with the rotational axis X. In this and later embodiments, the levers 8 and 7 can constitute first lever and second lever, respectively, or vice-a-versa.

Thus, the cable take up member 10 is rotatably within the housing 1 of the base member with rotation of the cable take up member 10 being controlled by movement of the cable winding lever 7 and the cable release lever 8, which pull and release the control cable 6 in a conventional manner. The control cable 6 (inner cable) is surrounded by an outer casing 5. The cable take up member 10 takes up an end of the control cable 6. In rotating the cable take up member 10, the cable 6 is pulled (winding direction) by movement of the cable winding lever 7 or released (release direction) by movement of the cable release lever 8.

The cable release lever 8 (first lever) is rotatably coupled to the base member about a rotational axis X for rotating the cable take up member 10 in a first direction (indicated by the arrow A). In the embodiment shown, the rotational axis X coincides with the axis of the fixing bolt 4. The first lever has a rest position as shown in FIG. 1. In moving the cable release lever 8 in the first direction A, the cable release lever 8 is moved into a shift position. Biasing means (not shown) return the cable release lever 8 from the shift position to the rest position.

The cable winding lever 7 (second lever) is also rotatably coupled to the base member for rotating the cable take up member in a second direction opposite to the first direction (the movement direction of the cable winding lever 7 is indicated by the arrow C). Thus, the shift controller is designed for the direction of rotations (A, C) of the cable release lever 8 and the cable winding lever 7 to be the same, thought rotation of the first lever in its direction of rotation A causes the cable take up member to be rotated in a first direction and rotation of the second lever in its direction of rotation C, which is the same direction as A, causes the cable take up member to be rotated in a second direction. As becomes especially apparent from FIG. 2, the cable release lever 8 and the cable winding lever 7 are independent from each other.

In the embodiment shown in FIG. 1, the first lever is designed in a Y-shape. The cable release lever 8 includes a first operation portion having a first operating surface 8a on the one arm of the Y-shaped lever. A second operating portion having a second operating surface 8b that is spaced apart from the first operating surface 8a is provided on the second arm of the Y-shaped lever. The first lever can be operated from its rest position to its shift position by exerting pressure on the first operating surface 8a or the second operating surface 8b. As becomes apparent from FIG. 1, with respect to the rotational axis X, the second operating surface 8b is angularly offset from the first operating surface 8a. The first operating surface 8a and the second operating surface 8b face backward toward the handlebar 12, when the clamping portion 3 of the base member is mounted to the handlebar 12.

Furthermore, the cable release lever 8 has a third operating portion having a third operating surface 8c that is spaced apart from the first operating surface 8a and is also provided on the second arm of the Y-shaped lever.

The cable winding lever 7 has an operating surface 7a. Exerting pressure on that operating surface 7a moves the cable winding lever 7 from its rest position to its shift position and thereby rotates the cable take up member in the cable-winding direction.

The cable release lever 8 has intermediate sections 13 that are provided to connect the operating portions to the connection with the rotational axis. As can be clearly seen from FIG. 2, the operating surfaces 8a and 8b are designed in a manner to allow for comfortable shifting. The operating surfaces 8a and 8b are orientated in planes that are orientated essentially perpendicular to the moving direction A of the lever. Thus, a large surface is provided to exert pressure on in order to move the lever in the moving direction A. Furthermore, the operating surfaces 8a and 8b are designed slightly beveled, which furthermore clearly distinguishes these surfaces as surfaces that are to be contacted by the user and that are to increase the comfort of conducting the shifting action.

Figure 2:
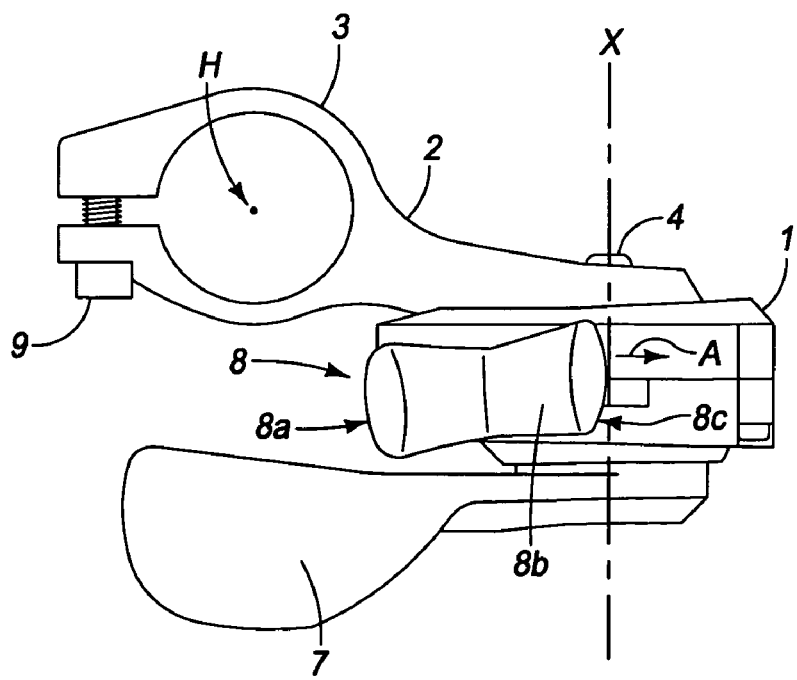
FIG. 2 is an outside elevational view of the shift controller illustrated FIG. 1 in accordance with the first embodiment of the present invention.

FIG. 2 furthermore shows a clamping bolt 9 that can be used to pull together the clamp position 3 in order to fix the bicycle shift controller to the handlebar 12.

The bicycle shift controller is operated by moving the cable release lever 8 either in the direction A or in the direction B in order to rotate the cable take up member 10 in the cable-release direction. Both movements (direction A and direction B) lead to the same movement of the cable take up member.

The cable release lever 8 can be moved from its rest position shown in FIGS. 1 and 2 in the direction A by placing the thumb on the operating surface 8a and pushing the lever forward or by placing the index finger with its back against the operating surface 8b and by pushing the operating surface 8b forward with the back of the index finger. The cable release lever 8 can be moved from its rest position in the direction B by placing the index finger on the operating surface 8c and pulling the lever in the direction B. The bicycle shift controller is operated by moving the cable winding lever 7 in the direction C in order to rotate the cable take up member in the cable-winding direction.

Second Embodiment

Figure 3:
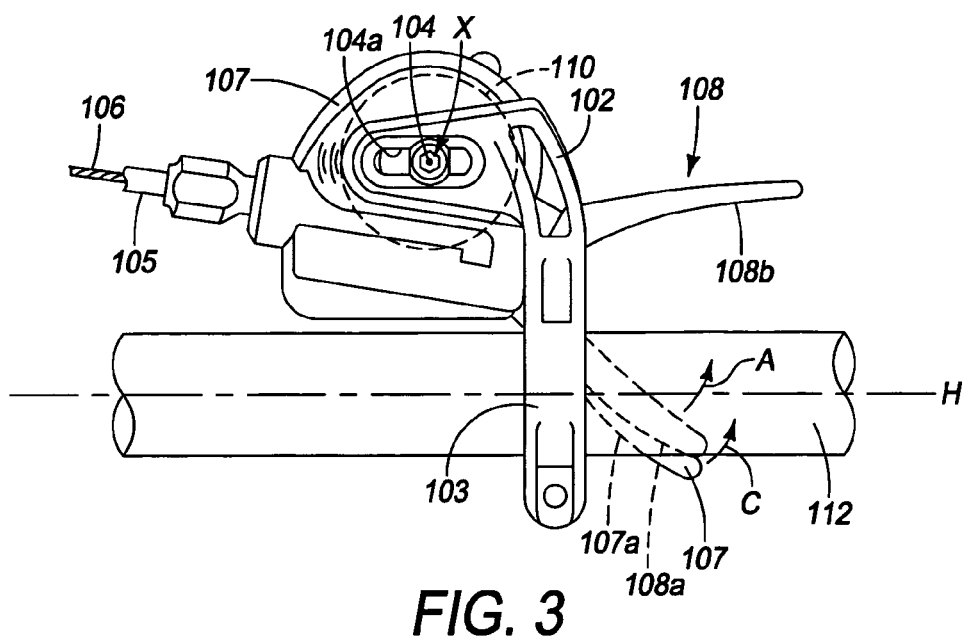
FIG. 3 is a simplified top plan view of a bicycle shift controller according to a second embodiment of the present invention, with the shift controller being attached to a handlebar for normal usage
Figure 4:
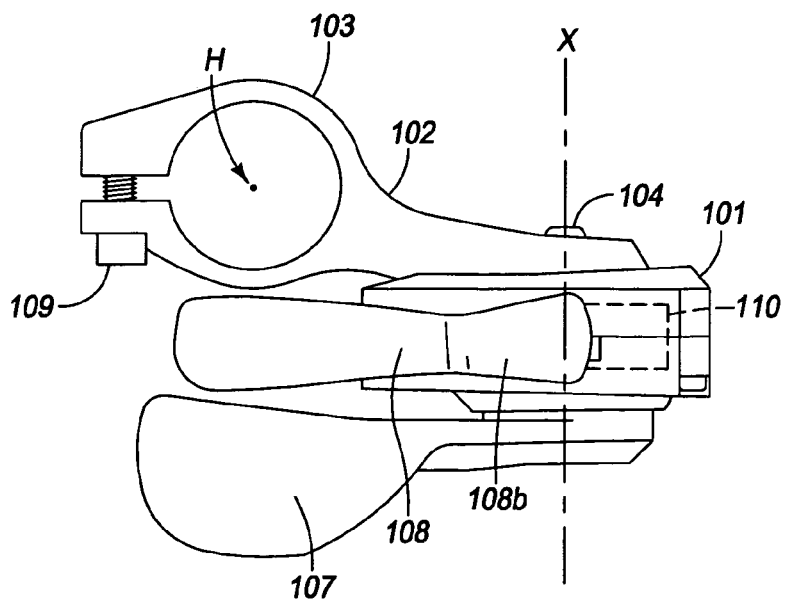
FIG. 4 is an outside elevational view of the shift controller illustrated FIG. 3 in accordance with the second embodiment of the present invention.

Referring now to FIGS. 3 and 4, a bicycle shift controller in accordance with a second embodiment will now be explained. The second embodiment shown in the FIG. 3 and FIG. 4 differs from the first embodiment only by the design of the release lever 8 of the first embodiment has been changed in this second embodiment. In view of the similarity between the first and second embodiments, the parts of the second embodiment that are identical to the parts of the first embodiment will be given the same reference numerals as the parts of the first embodiment but with the numbering increased by 100. Thus, the descriptions of the parts of the second embodiment that are identical to the parts of the first embodiment may be omitted for the sake of brevity.

The bicycle shift controller shown in FIGS. 3 and 4 includes a housing 101, a bracket 102 with a clamping portion 103 and a fixing bolt 104 connecting the bracket 102 to the housing 101 via an elongated hole 104a in the bracket 102. The bracket 102 constitutes a base member. As in the first embodiment, the base member has a control cable 106 with an outer casing 105. The control cable 106 is operatively coupled to both a cable winding lever 107 and a cable release lever 108. In particular, the cable winding lever 107 and the cable release lever 108 are operatively coupled to a cable take up member 110 that is rotatably mounted within the housing 101 of the base member about a rotational axis X. The cable winding lever 107 and the cable release lever 108 are also pivotally mounted about the rotational axis X of the cable take up member 110. In other words, the cable winding lever 107 and the cable release lever 108 have pivot axes that are coincident with the rotational axis X.

Figure 6:
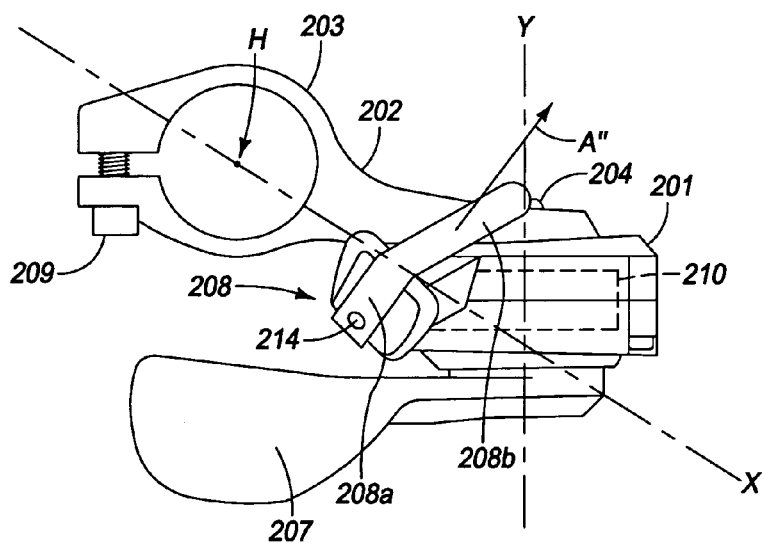
FIG. 6 is an outside elevational view of the shift controller illustrated FIG. 5 in accordance with the third embodiment of the present invention.

As becomes especially apparent from FIG. 6, the cable release lever 108 and the cable winding lever 107 are independent from each other. The cable release lever 108 includes a first operation portion having a first operating surface 108a on the one arm of the Y-shaped lever and a second operating portion having a second operating surface 108b that is provided on the second arm of the Y-shaped lever. Thus, the cable release lever 108 is also Y-shaped, but the two arms and thus the two operating surfaces 108a and 108b are spread apart wider. This arrangement is to facilitate the contact of the thumb with the operating surface 108a. As becomes apparent from FIGS. 3 and 4, with respect to the rotational axis X, the second operating surface 108b is angularly offset from the first operating surface 108a. The first operating surface 108a and the second operating surface 108b face backward toward a handlebar 112, when the clamping portion 103 of the base member is mounted to the handlebar 112 by tightening a bolt 109. Furthermore, the cable release lever 108 has a third operating portion having a third operating surface 108c that is spaced apart from the first operating surface 108a and is also provided on the second arm of the Y-shaped lever.

The cable winding lever 107 has an operating surface 107a. Exerting pressure on that operating surface 107a moves the cable winding lever 107 from its rest position to its shift position and thereby rotates the cable take up member 110 in the cable-winding direction.

Third Embodiment

Figure 5:
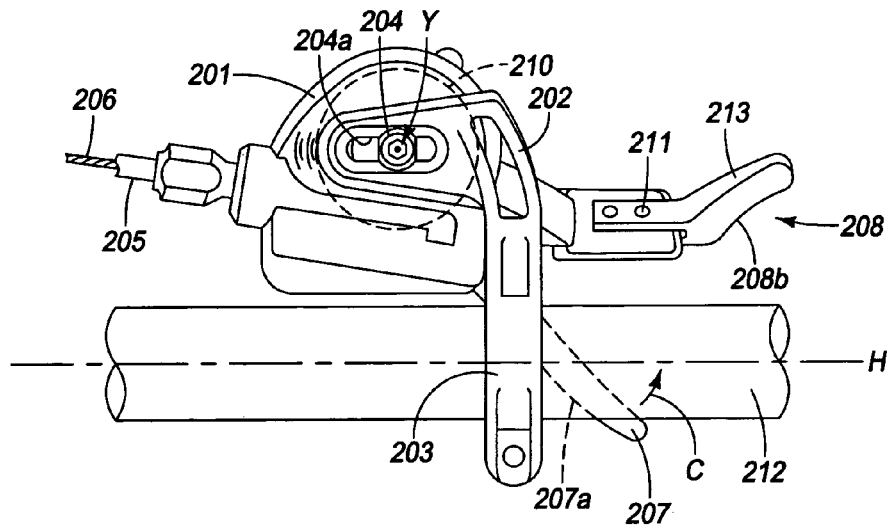
FIG. 5 is a simplified top plan view of a bicycle shift controller according to a third embodiment of the present invention, with the shift controller being attached to a handlebar for normal usage

Referring now to FIGS. 5 and 6, a bicycle shift controller in accordance with a third embodiment will now be explained. The third embodiment differs from the first embodiment by the design of the release lever 8 of the first embodiment has been changed in this third embodiment, the connection of the cable release lever 8 to the takeup member 10 has been changed in this third embodiment, and the pivot axis X of the cable release lever 8 has been changed in this third embodiment. In view of the similarity between the first and third embodiments, the parts of the third embodiment that are identical to the parts of the first embodiment will be given the same reference numerals as the parts of the first embodiment but with the numbering increased by 200. Thus, the descriptions of the parts of the third embodiment that are identical to the parts of the first embodiment may be omitted for the sake of brevity.

The bicycle shift controller shown in FIGS. 5 and 6 includes a housing 201, a bracket 202 with a clamping portion 203 and a fixing bolt 204 connecting the bracket 202 to the housing 201 via an elongated hole 204a in the bracket 202. The bracket 202 constitutes a base member. As in the first embodiment, the base member has a control cable 206 with an outer casing 205. The control cable 206 is operatively coupled to both a cable winding lever 207 and a cable release lever 208. In particular, the cable winding lever 207 and the cable release lever 208 are operatively coupled to a cable take up member 210 that is rotatably mounted within the housing 201 of the base member about a rotational axis Y. The cable winding lever 207 is also pivotally mounted about the rotational axis Y of the cable take up member 210. In other words, the cable winding lever 207 has a pivot axis that coincides with the rotational axis Y. The cable release lever 208, on the other hand is pivotally mounted to the housing 201 to pivot about a pivot axis X. The cable winding lever 207 and a cable release lever 208 can be connected to the cable take up member 210 using the mechanism disclosed in U.S. Pat. No. 6,095,010 or the like.

As becomes especially apparent from FIG. 6, the cable release lever 208 and the cable winding lever 207 are independent from each other. The cable release lever 208 includes a first operation portion having a first operating surface 208a on and a second operating portion having a second operating surface 208b. The cable release lever 208 is not Y-shaped. Instead, the second operating surface 208b is designed to border the first operating surface 208a. As seen in FIG. 5, the cable winding lever 207 includes an operation portion having an operating surface 207a.

The second operating surface 208b is arranged on an extension member 213 that is connected to the first operating portion by a pair of two millimeter headless set screws 211 and one three millimeter locking screw 214 that passes through the first operating portion, for example. The second operating surface 208b is arranged angularly offset from the first operating surface 208a about the rotational axis X and bordering the first operating surface 208a at an angle to the first operating surface 208a. The second operating surface 208b has a concave shape. The second operating surface 208b face backwards and downwards.

The rotational axis X differs from the rotational axis Y of the cable take up member. The rotational axis X is arranged at an angle to the rotational axis Y. With respect to the housing 201, the rotational axis X is arranged where the cable release lever 208 enters the housing 201. For example, the cable release lever 208 can have an axle (not shown) at a part that is just encased by the housing, the axle being held by bearing sockets in the housing and the axle being orientated in the direction of the rotational axis X, thus allowing the cable release lever 208 to rotate around the rotational axis X.

The shifting action in the cable-release direction can be effected by either pushing the cable release lever 208 by pushing with the thumb on the operating surface 208a or by pushing on the operating surface 208b with the back of the index finger. Hereby, the operating surface 208b is moved in the direction A", because of the orientation of the rotational axis X. This movement causes the cable take up member 210 to rotate around the rotational axis Y. The first and second operating surfaces 208a and 208b face backward toward a handlebar 212, when the clamping portion 203 of the base member is mounted to the handlebar 212 by tightening a bolt 209.

Fourth Embodiment

Figure 7:
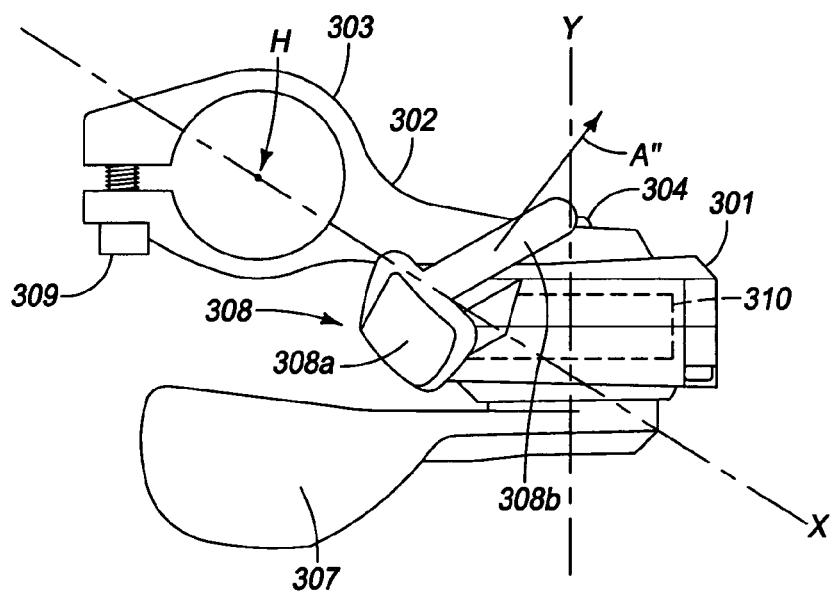
FIG. 7 is an outside elevational view of a bicycle shift controller according to a fourth embodiment of the present invention.

Referring now to FIG. 7, a bicycle shift controller in accordance with a fourth embodiment will now be explained. The fourth embodiment differs from the third embodiment by the design of the cable release lever 208 of the third embodiment has been changed in this fourth embodiment, i.e., the first operating portion and the second operating portion are formed integrally. In view of the similarity between the first and fourth embodiments, the parts of the fourth embodiment that are identical to the parts of the first embodiment will be given the same reference numerals as the parts of the first embodiment but with the numbering increased by 100 from the third embodiment. Thus, the descriptions of the parts of the fourth embodiment that are identical to the parts of the first embodiment may be omitted for the sake of brevity.

The bicycle shift controller shown in FIG. 7 includes a housing 301, a bracket 302 with a clamping portion 303 and a fixing bolt 304 connecting the bracket 302 to the housing 301. The bracket 302 constitutes a base member. As in the third embodiment, a cable winding lever 307 and a cable release lever 308 are operatively coupled to a cable take up member 310 that is rotatably mounted within the housing 301 of the base member about a rotational axis Y. The cable winding lever 307 is also pivotally mounted about the rotational axis Y of the cable take up member 310. In other words, the cable winding lever 307 has a pivot axis that coincides with the rotational axis Y. The cable release lever 308, on the other hand is pivotally mounted to the housing 301 to pivot about a pivot axis X. The cable winding lever 307 and the cable release lever 308 can be connected to the cable take up member 310 using the mechanism disclosed in U.S. Pat. No. 6,095,010 or the like. The first and second operating surfaces 308a and 308b face backward toward a handlebar, when the clamping portion of the base member is mounted to the handlebar by tightening a bolt 309.

GENERAL INTERPRETATION OF TERMS

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle shift controller comprising:
a base member configured to be mounted to a handlebar;
a cable take up member rotatably coupled to the base member to rotate about a rotational axis for winding and releasing a control cable;
a first lever including a first operating portion with a first operating surface and a second operating portion with a second operating surface, with the second operating surface being angularly offset from the first operating surface about a first lever pivot axis of the first lever, and the first lever being a cable-release lever that is pivotally coupled to the base member to pivot about the first lever pivot axis from a first rest position to a first shift position by exerting pressure on one of the first and second operating surfaces in a first operation direction for rotating the cable take up member in a first cable-release direction, the first and second operating surfaces being located forward with respect to a central handlebar axis while the bicycle shift controller is attached to the handlebar and the first lever is located in the first rest position, the first and second operating surfaces pivoting forward relative to the central handlebar axis and away from the central handlebar axis during exerting pressure on one of the first and second operating surfaces in the first operation direction; and
a second lever including a third operating portion with a third operating surface, and the second lever being pivotally coupled to the base member to pivot about a second lever pivot axis from a second rest position to a second shift position by exerting pressure on the third operating surface in a second operation direction for rotating the cable take up member in a cable-winding direction opposite to the cable-release direction, with the second lever being independently movable relative to the first lever, the third operating surface being located in a backward position with respect to the central handlebar axis while the bicycle shift controller is attached to the handlebar and the second lever is located in the second rest position, the first, second and third operating surfaces facing in the same direction along a circumferential direction about the rotational axis of the cable take up member as viewed from the rotational axis of the cable take up member, the first operation direction of the first lever and the second operation direction of the second lever directing the same direction as viewed from the rotational axis of the cable take up member.

2. The bicycle shift controller according to claim 1, wherein
the second lever is a cable-winding lever that is operatively coupled to the cable take up member for rotating the cable take up member in the cable-winding direction.

3. The bicycle shift controller according to claim 1, wherein
the second operating surface is extending from the first operating surface.

4. The bicycle shift controller according to claim 1, wherein
the first operating surface and the second operating surface both face at least either backward relative to the handlebar or downward relative to the handlebar while the bicycle shift controller is attached to the handlebar.

5. The bicycle shift controller according to claim 1, wherein
the second operating surface is located in a forward position with respect to the first operating surface while the bicycle shift controller is attached to the handlebar.

6. The bicycle shift controller according to claim 1, wherein
the second operating surface is located in a forward position with respect to the central handlebar axis while the bicycle shift controller is attached to the handlebar.

7. The bicycle shift controller according to claim 1, wherein
the first shift position is located in a forward position with respect to the first rest position while the bicycle shift controller is attached to the handlebar.

8. The bicycle shift controller according to claim 1, wherein
the second operating portion is an extension member that is attached to the first operating portion.

9. The bicycle shift controller according to claim 1, wherein
the second operating surface has a concave shape.

10. The bicycle shift controller according to claim 1, wherein
the rotational axis of the cable take up member is offset and non-parallel to the first lever pivot axis of the first lever.

11. The bicycle shift controller according to claim 10, wherein
the first operating surface and the second operating surface both face at least either backward relative to the handlebar or downward relative to the handlebar while the bicycle shift controller is attached to the handlebar.

12. The bicycle shift controller according to claim 10, wherein
the second operating surface is located in a forward position with respect to the first operating surface while the bicycle shift controller is attached to the handlebar.

13. The bicycle shift controller according to claim 10, wherein
the second operating surface is located in a forward position with respect to the central handlebar axis while the bicycle shift controller is attached to the handlebar.

* * * * *